United States Patent [19]

Thibodeau, Jr.

[11] Patent Number: 4,689,762
[45] Date of Patent: Aug. 25, 1987

[54] DYNAMICALLY CONFIGURABLE FAST FOURIER TRANSFORM BUTTERFLY CIRCUIT

[75] Inventor: David J. Thibodeau, Jr., Merrimack, N.H.

[73] Assignee: Sanders Associates, Inc., Nashua, N.H.

[21] Appl. No.: 649,029

[22] Filed: Sep. 10, 1984

[51] Int. Cl.⁴ .............................................. G06F 15/31
[52] U.S. Cl. ..................................................... 364/726
[58] Field of Search ........................................ 364/726

[56] References Cited

U.S. PATENT DOCUMENTS

| | | | |
|---|---|---|---|
| 3,584,781 | 6/1971 | Edson | 364/726 |
| 3,588,460 | 6/1971 | Smith | 364/726 |
| 3,638,004 | 1/1972 | Sloane et al. | 364/726 |
| 3,673,399 | 6/1972 | Hancke et al. | 364/726 |
| 3,686,490 | 8/1972 | Goldstone | 364/726 |
| 3,746,848 | 7/1973 | Clary | 364/726 |
| 3,777,131 | 12/1973 | Llewellyn | 364/726 |
| 3,800,130 | 3/1974 | Martinson et al. | 364/726 |
| 3,803,391 | 4/1974 | Vernet | 364/726 |
| 3,881,097 | 4/1975 | Lehmann et al. | 364/726 |
| 3,926,367 | 12/1975 | Bond et al. | 364/726 |
| 4,051,357 | 9/1977 | Bonnerot | 364/726 |
| 4,054,785 | 10/1977 | Lehmann | 364/726 |
| 4,164,021 | 8/1979 | Nishitani et al. | 364/726 |
| 4,275,452 | 6/1981 | White | 364/726 |
| 4,282,579 | 8/1981 | Speiser et al. | 364/726 |
| 4,321,680 | 3/1982 | Bertrand et al. | 364/485 |
| 4,344,151 | 8/1982 | White | 364/726 |

OTHER PUBLICATIONS

Singleton, "An Algorithm for Computing the Mixed Radis FFT", *IEEE Trans. on Audio and Electroacoustics*, vol. AU-17 No. 2, Jun. '69, pp. 93-103.

Nussbaumer, "Method of Computing the DFT of N--Point Real data Sequence", *IBM Tech. Disclosure Bulletin*, vol. 23, No. 2, Jul. '80, pp. 630-633.

Preuss, "Very Fast Computation of the Radio-2 DFT", *IEEE Trans. on Acoustics, Speech and Signal Processing*, vol. ASSP-30, No. 4, Aug. '82, pp. 595-607.

Vernet, J. L., "Real Signals Fast Fourier Transform: Storage Capacity and Step Number Reduction by Means of an Odd Discrete Fourier Transform" in *Proceedings of the IEEE*, vol. 59, No. 10, pp. 1531-1532, Oct. 1971.

*Primary Examiner*—David H. Malzahn
*Attorney, Agent, or Firm*—Richard I. Seligman; Stanton D. Weinstein

[57] ABSTRACT

A decimation-in-frequency fast-Fourier-transform butterfly circuit for performing a radix-four butterfly operation includes a first group of adders (86, 88, 90, and 92), a second group of adders (70, 72, 74, and 76), and a group of twiddle-factor multipliers (78, 80, and 82) that are interconnected in such a way as to perform the radix-four fast-Fourier-transform algorithm. Additionally, bypass lines (102, 104, 106, and 108) bypass the first group of adders, and switches (94, 96, 98, and 100) switch between the signals on the bypass lines and those from the first group of adders. As a result, the circuit performs a radix-four FFT operation when the switches are in one state, and it performs two radix-two FFT butterfly operations simultaneously when the switches are in the other state.

22 Claims, 12 Drawing Figures

FIG. 8 TIMING

DYNAMICALLY CONFIGURABLE FAST FOURIER TRANSFORM BUTTERFLY CIRCUIT

BACKGROUND OF THE INVENTION

The present invention is directed to circuitry for performing a fast-Fourier-transform operation. It is directed particularly to butterfly circuits used in such operations.

Digital signal processing has advanced to a state in which discrete Fourier transformations of data sampled at frequencies on the order of megahertz can be performed in real time. In any case in which the number of samples in each transformation is at all large, the so-called fast Fourier transform is used.

The fast Fourier transform is is an algorithm that is based on the fact that a discrete Fourier transformation can be generated by combining, in a relatively simple manner, Fourier transformations of subsets of the input record. Each of these subset transformations, in turn, can be generated from even smaller subsets. Typically, the input-data record is ultimately divided into sub-records of only two or four data points on which two- or four-point discrete Fourier transforms are performed. The results of these operations are multiplied by so-called twiddle factors—i.e., complex numbers equal to exponentials of purely imaginary arguments——and then subjected to further two-or four-point Fourier transformations.

There is no reason in theory why the individual transformations have to be two-point or four-point operations, but these are the most popular because the multiplications in two- or four-point Fourier transformations are all operations in which one of the factors is plus or minus unity or plus or minus the square root of minus one; in other words, no multiplication circuit is needed for the individual transformations in two- or four-point transforms, although multiplication circuits are necessary for twiddle-factor multiplications.

In a circuit for implementing a fast Fourier transformation, a hardware device for performing the basic two- or four-point Fourier transformation and multiplying by twiddle factors is used repeatedly. It is referred to as a butterfly circuit. If it performs a two-point transformation, the circuit is referred to as a radix-two butterfly circuit, whereas a butterfly circuit that performs a four-point transformation is referred to as a radix-four butterfly circuit.

The choice of which type of butterfly circuit to use depends on a number of factors, including the speed required and the number of sample points in each transformation. In general, any reasonably long transformation that can be performed in a radix-four circuit requires fewer multiplications in a radix-four circuit than it does in a radix-two circuit, so the radix-four circuit is in some sense more efficient. However, the radix-four circuit requires more hardware and is thus more expensive. Furthermore, a system that performs only radix-four butterfly operations can transform only an input record whose number of samples is $4^K$, where K is a positive integer. A radix-two butterfly circuit, on the other hand, requires less hardware and can operate on any sample whose length is $2^K$.

In selecting hardware for multi-purpose fast Fourier transformation, therefore, one must first decide which type of butterfly circuit to use. If the required speed and efficiency are low enough, use of a radix-two butterfly circuit is desirable in light of its lower cost and the greater versatility in selection of input-record lengths. In a multi-purpose environment, however, it is not always possible to predict the speed that will be needed, and the user may soon find that he needs to purchase a radix-four butterfly circuit in addition to his radix-two butterfly circuit.

On the other hand, purchasing a radix-four butterfly circuit right away saves the cost of a radix-two butterfly circuit if the efficiency afforded by a radix-four circuit proves to be necessary. However, if more versatility in the selection of record length is needed than is afforded with a radix-four system, a radix-two butterfly circuit will additionally need to be used with the radix-four butterfly circuit to achieve the radix-four speed for radix-two record lengths. At present, therefore, many multi-purpose transformation devices end up with both radix-two hardware and radix-four hardware.

Moreover, there is often an additional requirement for a complex-to-real processor if, as is typically the case, the input data are purely real. Purely real input data can be applied to both the real and the imaginary input ports of the system so that the capacity of the FFT circuit is not wasted. If they are, however, the complex-to-real hardware is needed to adjust for the fact that real data are applied to the imaginary ports.

An object of the present invention is thus to reduce the hardware requirements of fast-Fourier-transform circuits.

SUMMARY OF THE INVENTION

The foregoing and related objects are achieved in a radix-four butterfly circuit in which certain complex adder circuits normally included in such a radix-four circuit are arranged so that the inputs that they receive can be changed in such a manner that they generate radix-two outputs.

A conventional radix-four circuit includes a pair of input circuits, four combination circuits made up of adders, and three twiddle-factor circuits, typically multipliers. Each of the input circuits receives two complex inputs and generates two complex outputs, both of which depend on both of the complex inputs. Each of the four combination circuits receives two of the input-circuit outputs and generates from them a combination output that is dependent on both of the input-circuit outputs.

The positions of the twiddle-factor circuits depend on whether the transformation is performed by the decimation-in-time method or the decimation-in-frequency method. Each twiddle-factor circuit receives complex data-dependent inputs and complex twiddle-factor inputs that are independent of the input data but depend on the point in the algorithm at which the butterfly circuit is currently operating. If the butterfly circuit performs a decimation-in-time operation, the twiddle-factor circuit is part of the input circuit and receives as its inputs the data inputs to the butterfly circuit, and it generates a twiddle-factor output that the input circuit uses in generating its input-circuit output. If the butterfly circuit performs a decimation-in-frequency operation, then each twiddle-factor circuit receives as its data-dependent input a combination output, and the output of the twiddle-factor circuit is then a butterfly-circuit output.

A conventional radix-four circuit also includes a control circuit that applies twiddle-factor inputs to the twiddle-factor circuits in accordance with the particular algorithm being performed.

According to my invention, at least one of the input circuits is operable to generate as its output either its usual output for a radix-four operation or the output that an input circuit would generate in a radix-two butterfly circuit. Whatever output it generates is then applied as usual to its combination circuit. The control circuit controls the input circuits according to whether the output should be of the radix-two or radix-four variety. As a result, most of the hardware elements used in the radix-four butterfly operation can be used in performing a radix-two butterfly operation.

BRIEF DESCRIPTION OF THE DRAWINGS

These and further features and advantages of the present invention are described in connection with the accompanying drawings, in which.

DETAILED DESCRIPTION OF THE PREFERRED EMBODIMENTS

Figure 1:
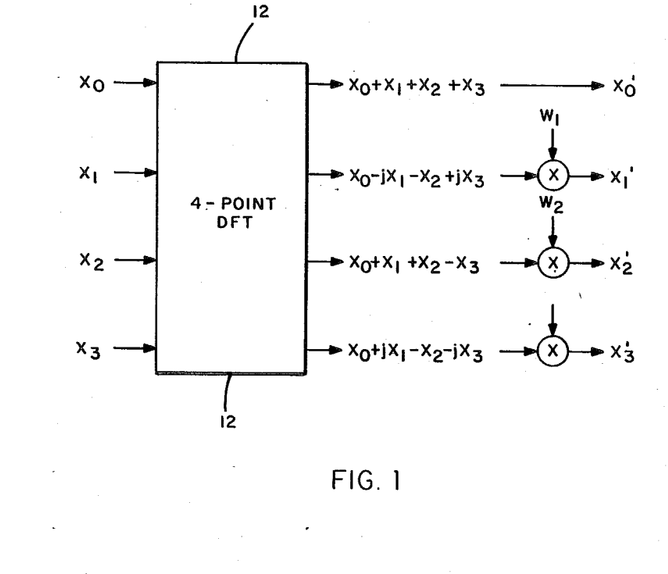
FIG. 1 is a block diagram that shows the operation that any radix-four decimation-in-frequency butterfly circuit performs.
Figure 2A:
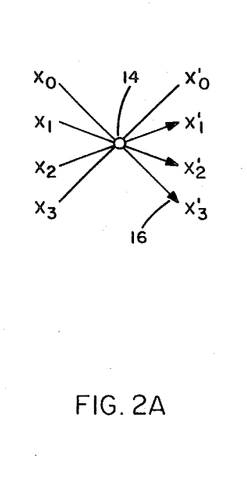
FIGS. 2A-2C are symbols often used to represent butterfly operations of various types.
Figure 2B:
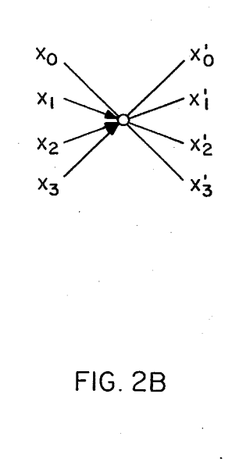
Figure 2C:
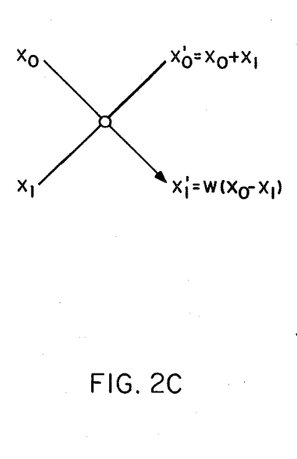
Figure 3:
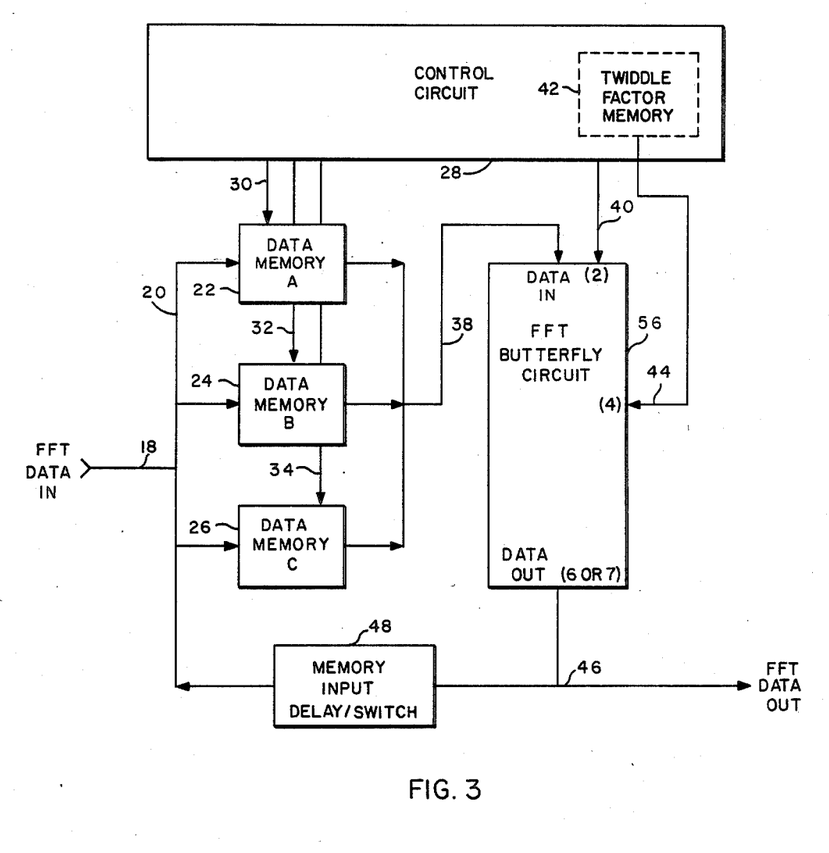
FIG. 3 is a block diagram of a fast-Fourier-transform circuit in which the butterfly circuit of the present invention can be used.
Figure 4:
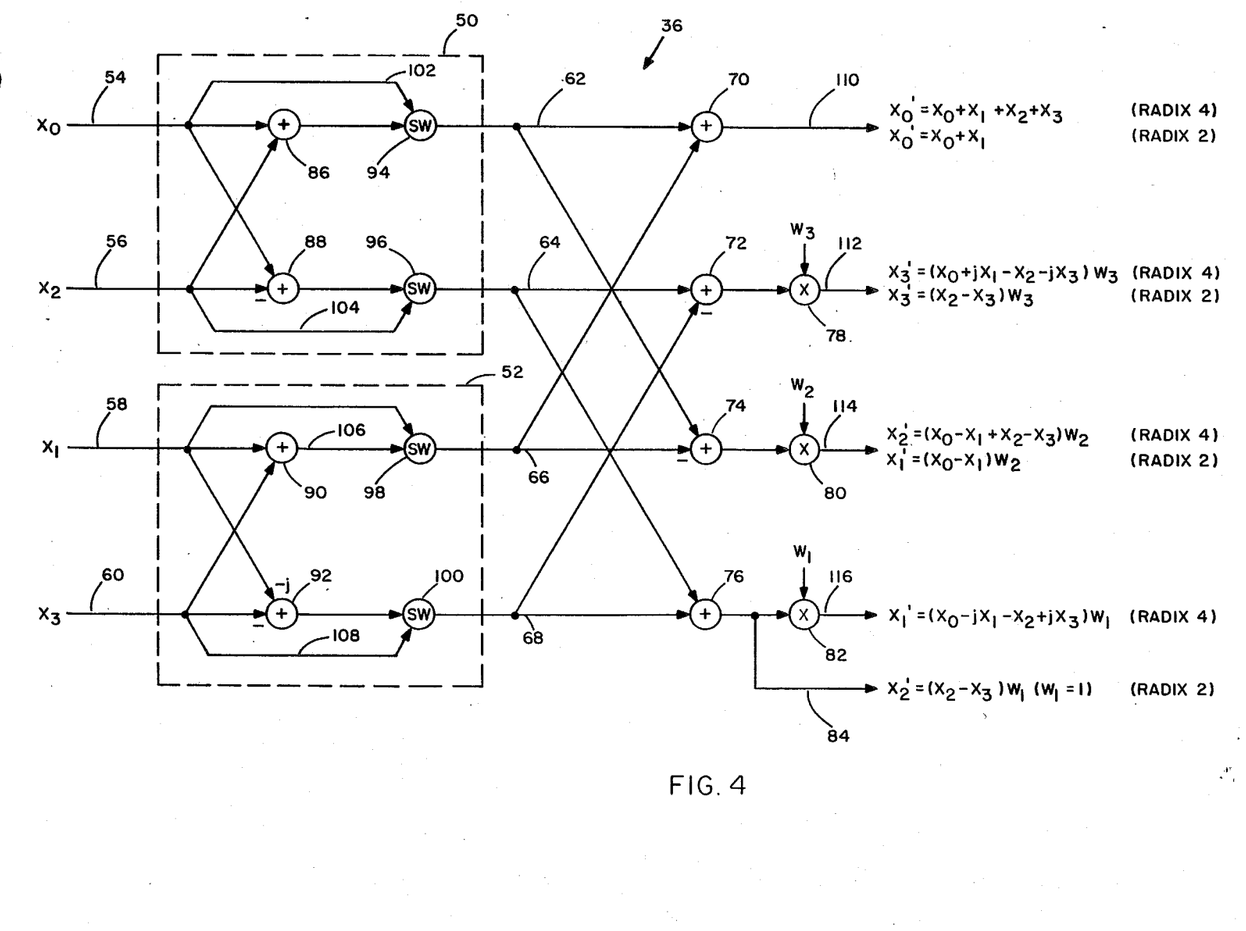
FIG. 4 is a complex-operation-level diagram of a decimation-in-frequency embodiment of the butterfly circuit of the present invention with the complex-to-real capability omitted.

Before a discussion of the butterfly circuit of the present invention is reached in connection with FIG. 4, the basic operation that it performs and the environment in which it performs will be set out in connection with FIGS. 1, 2A-C, and 3. The basic radix-four butterfly operation is shown diagrammatically in FIG. 1, in which a block 12 represents a machine for performing the functions necessary to generate a discrete Fourier transformation of four input points. The butterfly operation of FIG. 1 is a radix-four butterfly of the decimation-in-frequency variety. The four inputs $X_0$—$X_3$ are in general complex numbers. They may be original inputs to the Fourier transformation or intermediate results of previous butterfly operations.

The sequences in which butterfly operations can be performed to carry out fast Fourier transformation will not be described here, since they are well known to those skilled in the art. A discussion of fast Fourier transformation can be found in many of the basic texts, such as Rabiner and Gold, *Theory and Application of Digital Signal Processing*, pages 356–381 (Prentice-Hall 1975). The expressions to the right of block 12 will be recognized as the output values of a four-point discrete Fourier transformation.

Also included in a butterfly operation is the application of so-called twiddle factors. The twiddle factors, $W_1$, $W_2$, and $W_3$, are various Nth roots of unity, where N is the number of samples in the overall transformation, as opposed to the number (four) of complex numbers in each individual butterfly operation. An overall transformation algorithm requires repeated butterfly operations. These are performed first on sets of the input samples, then on sets of the results of the first butterfly operation, and then, if the number of samples is great enough, on the results of further butterfly operations. As the basic texts indicate, the particular roots that are used for any given butterfly operation are determined by the point in the algorithm at which the butterfly circuit is currently operating; the twiddle factors are not in general the same for successive operations of the butterfly circuit. The outputs $X'_0$–$X'_3$ differ from discrete-Fourier-transform values because of the application of the twiddle factors.

Diagrams of overall FFT operations frequently represent individual butterfly operations with symbols like those of FIGS. 2A–C. The open circle 14 of FIG. 2A represents computation of a four-point discrete Fourier transformation (DFT), while arrows such as arrow 16 represent multiplication by twiddle factors. FIG. 2A is a symbol for the radix-four decimation-in-frequency butterfly operation illustrated in FIG. 1, while FIG. 2B is a diagram of a radix-four decimation-in-time butterfly operation, in which the twiddle factors are applied to the DFT inputs rather than to the DFT outputs.

As will be described below, the butterfly circuit of the present invention can be arranged to perform mixed-radix FFT operations; that is, it can perform radix-four operations on some passes through the data and radix-two operations on other passes. FIG. 2C represents a radix-two butterfly operation of the decimation-in-frequency variety and includes the definitions of the radix-two decimation-in-frequency outputs.

An overall FFT circuit in which the butterfly circuit of the present invention may be used is depicted in block-diagram form in FIG. 3. Digital data, typically converted from analog samples, are received over an input line 18 and applied to a memory bus 20, which supplies data to various data memories 22, 24, and 26. The memory location in which a given datum is stored is determined by a control circuit 28, which applies enable and address signals to memories 22, 24, and 26 by way of signal paths 30, 32, and 34, respectively. The butterfly circuit 36 of the present invention receives data from the memories 22, 24, and 26 over signal lines 38, its timing being coordinated with that of the memories by signals received over signal lines 40 from the control circuit 28. The control circuit also includes a twiddle-factor memory 42, which supplies twiddle factors in accordance with the algorithm currently being performed and supplies these over signal lines 44 to the butterfly circuit 36.

The outputs of the butterfly circuit appear on an output bus 46. These outputs are returned to the memories by way of a memory-input delay/switch circuit 48 during the first passes through the data. Because a complete set of input data for a particular butterfly operation is stored in a single memory location, circuit 48 accumulates outputs from more than one butterfly operation and rearranges them for storage in the order necessary for the next pass. Input data are received in one memory, the butterfly circuit 36 fetches data from another memory, the results are returned to a third memory, and the functions of the individual memories are swapped as different memories are filled and emptied.

As those skilled in the art will recognize, it is possible to perform a fast Fourier transform "place"; that is, the outputs of each individual butterfly operation can be stored in the locations from which the inputs of that operation were obtained. The principles of the present invention can be used to perform an in-place operation, but the illustrated embodiment uses separate memories—that is, it executes a "not-in-place" algorithm—in order to accommodate the speeds of the particular memory hardware that it uses. Additionally, some addressing convenience is obtained with separate memories because a so-called constant-geometry algorithm can be employed.

During the first several passes through the data, the outputs of the butterfly circuit 36 are returned to the memories, but a final pass is eventually reached in which the outputs are the intended outputs of the overall fast Fourier transformation. At that point, the data on bus 46 are not returned to the memories; they are sent on over the bus 46 for use or further processing.

FIG. 4 depicts one embodiment of the butterfly circuit 36 at the complex-operation level. The circuit 36 includes two input circuits indicated by dashed lines 50 and 52. Each input circuit has a pair of input ports, at each of which it receives signals representing a single complex number. Input circuit 50 receives one complex input on each of signal paths 54 and 56, while input circuit 52 receives complex-number signals on input signal paths 58 and 60. Input circuit 50 operates on its inputs to provide two input-signal outputs, each of which represents a single complex number, on signal paths 62 and 64. Input circuit 52 provides similar outputs on signal paths 66 and 68.

Four combining circuits 70, 72, 74, and 76 in the form of adders operate on different combinations of the input-circuit outputs. Adder circuits 70 and 76 perform complex additions, while adder circuits 72 and 74 perform complex subtractions. Adder circuits 70 and 74 receive as their inputs the input-circuit outputs on signal lines 62 and 66, while adder circuits 72 and 76 receive the signals on lines 64 and 68. The output of adder circuit 70 constitutes the $X'_0$ output of the butterfly circuit 36. The outputs of the other adders 72, 74, and 76 must first be multiplied by twiddle factors before they constitute the proper radix-four butterfly outputs. This multiplication is performed by multiplier circuits 78, 80, and 82, which multiply the outputs of adders 72, 74, and 76 by twiddle factors $W_3$, $W_2$, and $W_1$, respectively. The twiddle factors are supplied by the control circuit 28, as was explained in connection with FIG. 3.

Also shown in FIG. 4 is an extra output signal path 84, which bypasses twiddle-factor multiplier 82. If the butterfly circuit 36 is operating in the radix-two mode, the signal on path 84 represents a correct value of $X_2'$, because the twiddle factor is unity. This signal path is actually redundant, since the twiddle factor $W_1$ applied by multiplier 82 is unity for all radix-two operations; the signal on path 84 is the same as the output of multiplier 82. In the preferred embodiment, however, various portions of the circuit 36, including multiplier 82, can be omitted to leave a radix-two-only butterfly circuit. Such a circuit can later be expanded with the addition of multiplier 82 and adders 86, 88, 90, and 92 to make a radix-four circuit. In such an arrangement, path 84 would provide an output even though multiplier 82 is not present.

More specifically, each input circuit in FIG. 4 includes a pair of adders. Input circuit 50 includes an adder 86, which receives as its inputs the complex-number signals on signal paths 54 and 56 and adds them. Another adder 88 receives the same two signals but subtracts the signal on path 56 from that on 54. Thus, the output of complex adder 86 is $X_0+X_2$ while the output of complex adder 88 is $X_0-X_2$.

Similar adders 90 and 92 in input circuit 52 combine the two complex-number inputs on lines 58 and 60 to generate a pair of complex-number outputs. The output of adder 90 is $X_1+X_3$. The output of complex adder 92 is $-j(X_1-X_3)$. (As will become apparent in connection with FIG. 5, the hardware of adder 92 is no more complicated than that of, say, adder 88.)

The butterfly circuit 36 is depicted in FIG. 4 as including four switches 94, 96, 98, and 100. These switches receive the outputs of adders 86, 88, 90, and 92, respectively. They receive as further inputs the signals on signal paths 102, 104, 106, and 108, respectively. In actuality, the switching represented by symbols 94, 96, 98, and 100 is provided, as will be explained below, by wired-together tri-state output ports of latches that hold these signals, not by separate switches. Enabling one or the other of the wired-together output ports by the control circuit 28 selects the signals that are placed on signal paths 62, 64, 66, and 68.

When the "switches" 94, 96, 98, and 100 choose the adder outputs, the outputs of the butterfly circuit 36 are the quantities indicated in FIG. 1 as being the outputs of a radix-four decimation-in-time butterfly operation. According to the present invention, most of the hardware that is used to generate these radix-four butterfly outputs can be used to generate radix-two butterfly outputs by simply using lines 102, 104, 106, and 108 to bypass the initial stage of adders 86, 88, 90, and 92. If the switches 94, 96, 98, and 100 are operated to choose the signals on paths 102, 104, 106, and 108, the outputs of the input circuits 50 and 52 are radix-two combination-circuit inputs, and the outputs of the butterfly circuit 36 will be two sets of radix-two outputs of the form indicated in FIG. 2C. This switching between paths is readily achieved in a pipeline butterfly circuit to add the versatility of a radix-two FFT system to the power of a radix-four FFT system with minimal additional hardware.

As was mentioned in the introduction, the data on which the overall fast Fourier transformation is to be performed typically are purely real, and the imaginary input ports of the butterfly circuit thus would not be put to use during the first pass of the transformation if the real data were fed only to the real ports. Accordingly, some of the real data are fed to the imaginary ports. Without more, of course, this would cause erroneous results. But there is an algorithm for transforming such erroneous results into proper results. Specifically, the proper transformation is derived from the "erroneous" transformation in accordance with the following formula:

$$2R'(n) = R(n) + R(N - n) + [I(n) + I(N - n)]\cos(\pi n/N) -$$

$$2I'(n) = I(n) - I(N - n) - [I(n) + I(N - n)]\sin(\pi n/N) - $$

$$[R(n) - R(N - n)]\sin(\pi n/N)$$

$$[R(n) - R(N - n)]\cos(\pi n/N)$$

where R(n) is the real part of the nth "erroneous" output point, I(n) is the imaginary part of the nth "erroneous" output point, R'(n) is the real part of the nth correct output point, and I'(n) is the imaginary part of the nth correct output point.

These outputs can be generated efficiently at the same time as the values for X'(N-n). This can be seen by substituting the following identities into the equations above:

$$\cos[\pi(N-n)/N] = \cos(\pi - \pi n/N) = -\cos(\pi n/N)$$

$$\sin[\pi(N-n)/N] = \sin(\pi - \pi n/N) = \sin(\pi n/N)$$

This results in:

$$2R'(N - n) = R(N - n) + R(n) - $$

$$[I(N - n) + I(n)]\cos(\pi n/N) - [R(N - n) - R(n)]\sin(\pi n/N)$$

$$2I'(N - n) = I(N - n) - I(n) - $$

$$[I(N - n) + I(n)]\sin(\pi n/N) + [R(N - n) - R(n)]\cos(\pi n/N)$$

With a small amount of additional circuitry, the circuit of FIG. 4 can be modified to perform this complex-to-real transformation in addition to the functions provided by the circuitry of FIG. 4. The modification is illustrated in FIG. 5.

Figure 5:
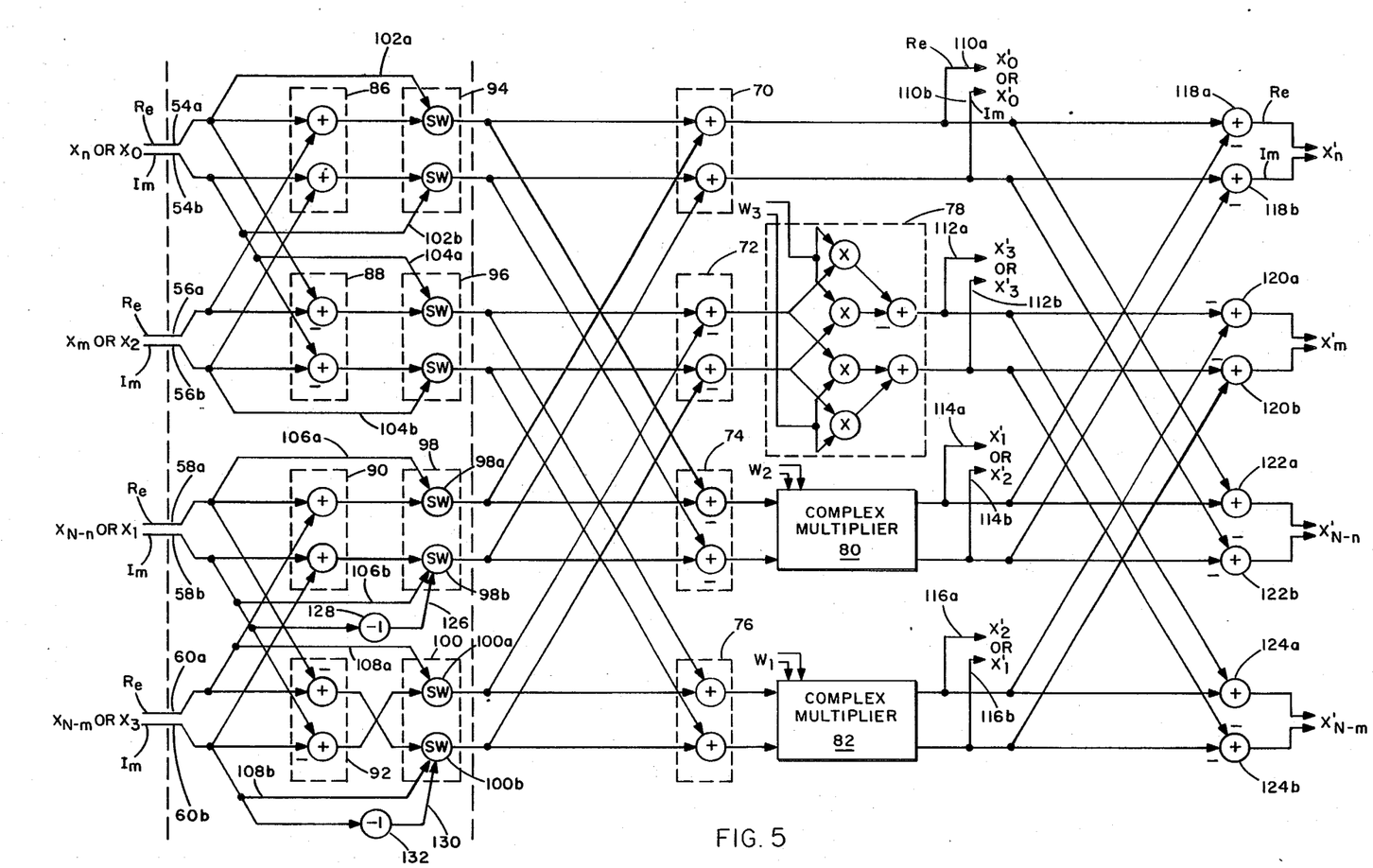
FIG. 5 is a more detailed diagram of the embodiment of FIG. 4 with the complex-to-real capability included.

In FIG. 5, double lines replace the single lines in FIG. 4 so that the separate real and imaginary parts of a complex-number signal are shown explicitly. For example, the output lines 110, 112, 114, and 116 of FIG. 4 are replaced in FIG. 5 by lines 110a and 110b, 112a and 112b, 114a and 114b, and 116a and 116b, respectively. Multiplier 78 is shown as the four individual multipliers and two adders that make up a complex multiplier, while multipliers 80 and 82, which are identical to multiplier 78, are depicted merely as blocks. The several adders and switches are shown as respective pairs of adders and switches, respectively. In particular, the operation represented in FIG. 4 by the "−j" notation at adder 92 is shown explicitly in FIG. 5. In this adder, the real part of $X_1$ is subtracted from the real part of $X_3$, the imaginary part of $X_3$ is subtracted from the imaginary part of $X_1$, and the resultant outputs are exchanged.

In addition to the elements that correspond to elements in FIG. 4, the circuit of FIG. 5 has a group of adders 118a and 118b, 120a and 120b, 122a and 122b, and 124a and 124b, which receive the signals on lines 110a and 110b, 112a and 112b, 114a and 114b, and 116a and 116b, respectively. second bypass line 126 including a circuit 128 for changing the sign of the imaginary part of $X_1$ and applying it as a third input to switch 98b as well as a similar line 130 and circuit 132 for providing a third input to switch 100b.

When exclusively real data are applied to both the real and the imaginary input ports of the butterfly circuit during the first pass, the fast Fourier transform is performed in the usual manner, but, after the last normal FFT pass, a further pass is performed that employs the additional circuitry of FIG. 5. During this pass, switches 94, 96, 98a, and 100a are placed in the state in which they would be for a radix-two butterfly operation. Switches 98b and 100b on the other hand, are operated to receive the signals on lines 126 and 130, respectively. Data in the last pass are organized so that the $X_0$ input port receives some transform output $X_n$, while the $X_1$ port receives $X_{N-n}$. Some other transform output $X_m$ is applied to the $X_2$ input port, while $X_{N-m}$ is applied to the $X_3$ input port. The complex multipliers 78, 80, and 82 are operated with $W_1$ equal to unity, $W_2$ equal to $\sin(\pi n/N) + j \cos(\pi n/N)$, and $W_3$ equal to $\sin(\pi m/N) + j \cos(\pi m/N)$. Review of the complex-to-real equations set forth above and the operations performed by the circuit of FIG. 5 reveals that the circuit of FIG. 5 performs the above-described mathematical operations to generate the proper discrete-Fourier-transform outputs.

An important benefit of the embodiment depicted in FIG. 5 is the modularity of its organization. Much of the circuit can be omitted to leave a radix-two-only butterfly circuit with a complex-to-real capability. Then, when a radix-four capability is subsequently needed, the additional circuitry can readily be added to the existing radix-two circuitry. A potential user who is not sure whether he will need the radix-four capability can therefore begin with the radix-two-only circuitry and then expand to radix four later on without investing in a completely separate radix-four circuit. Specifically, one can omit the portion of the FIG. 5 circuit between the $X_2$ input port and the $X'_2$ output port and that between the $X_3$ input port and $X'_3$ output port as well as adders 86 and 90, and the circuit that is left will be one that can perform a single radix-two butterfly operation and one set of complex-to-real conversions.

Figure 6:
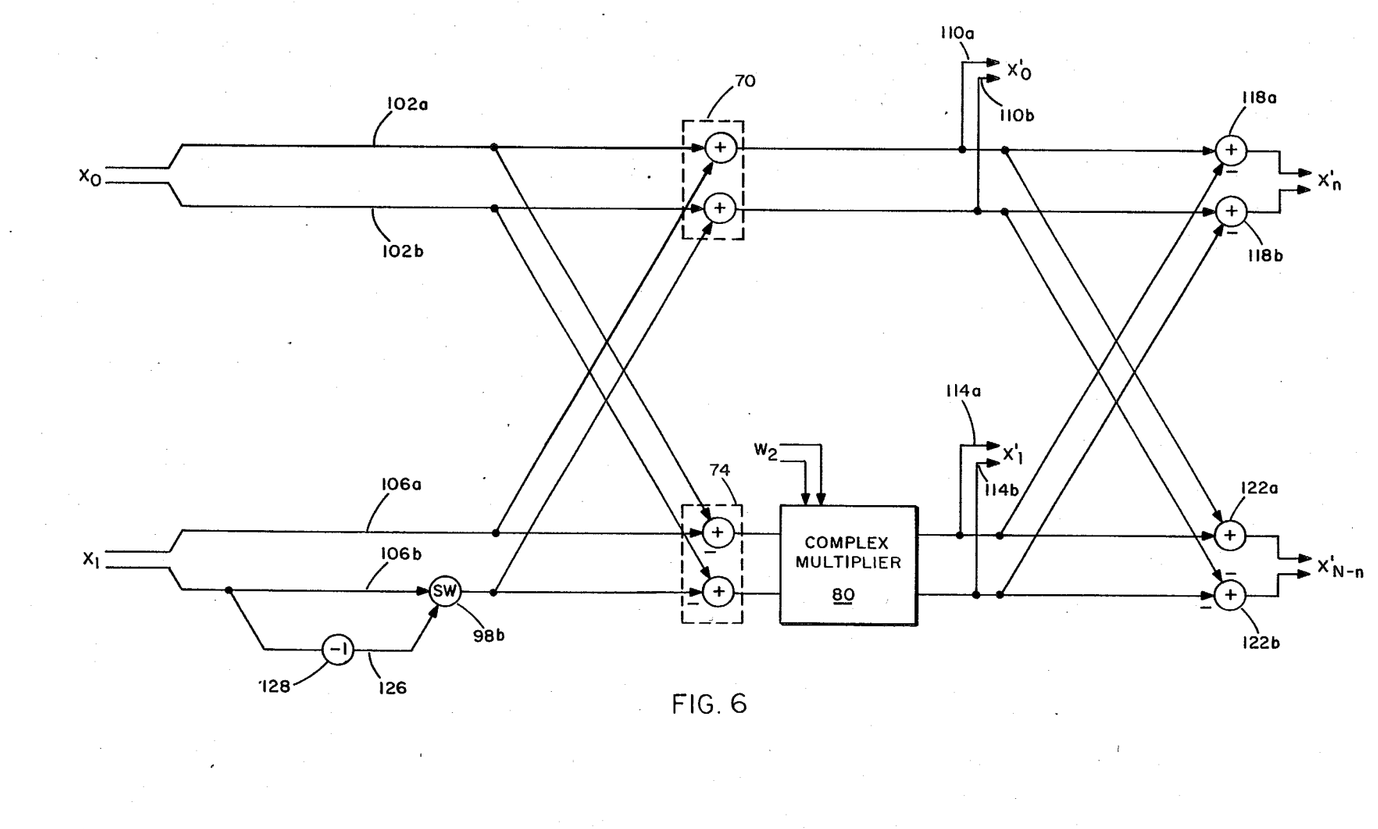
FIG. 6 is a diagram of only those parts of the FIG. 5 circuit that are needed for a single radix-two butterfly operation and complex-to-real conversion.

Such a circuit is shown in FIG. 6. No detailed description of FIG. 6 is necessary, since all of its features are included in FIG. 5. It is only to be noted that switches 94 and 98a, which were not mentioned above as being omitted to produce a single radix-two circuit, are not shown in FIG. 6. The reason for this is, as was mentioned above, that switches 94 and 98 are merely schematic representations of buses onto which different sets of tri-state devices are connected and separately enabled. With adders 86 and 90 eliminated, only the bus represented by "switch" 98b has more than one tri-state output port connected to it, so it is the only one at which any switching takes place.

Figure 7:
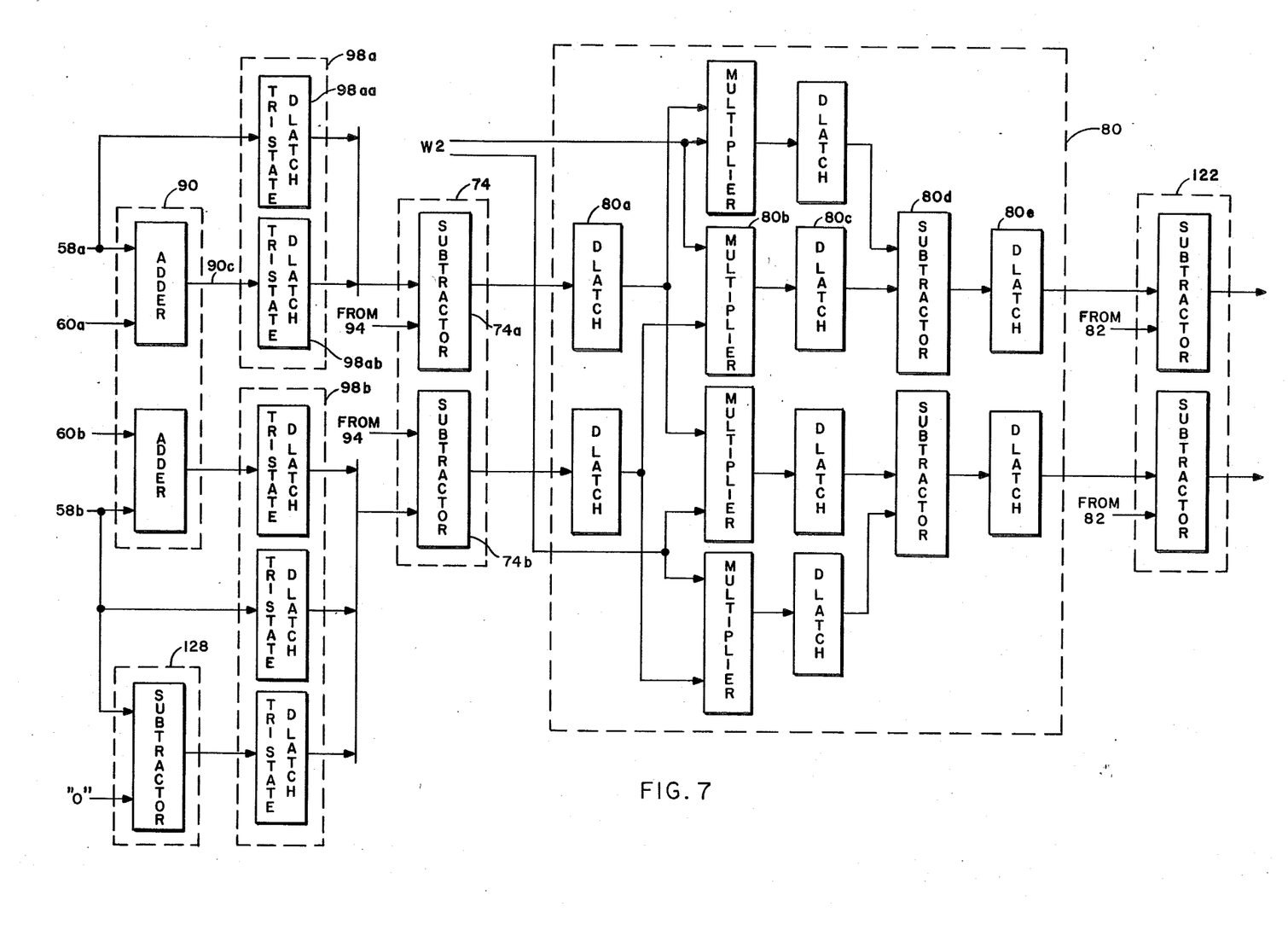
FIG. 7 is a chip-level diagram of representative portions of the FIG. 5 circuit that show its pipeline organization.
Figure 8:
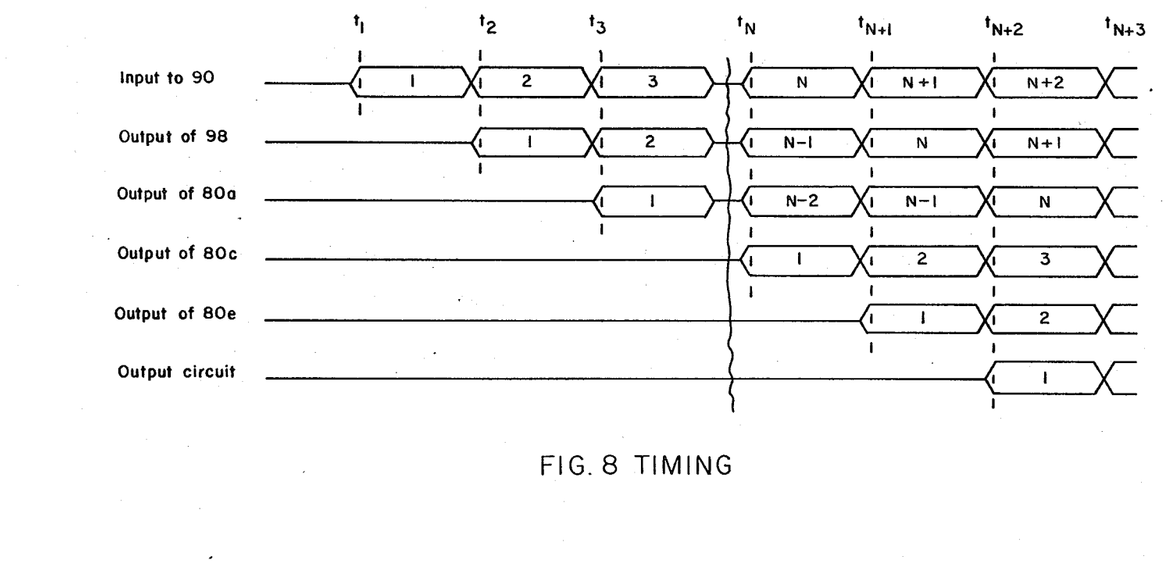
FIG. 8 is a timing diagram of the pipeline operation of the circuit of FIG. 7.

The arrangements described so far lend themselves to operation in a pipeline manner, in which a portion of the butterfly operation for one set of operands takes place concurrently with later butterfly operations on previously received operands. The timing is illustrated by reference to FIGS. 7 and 8. FIG. 7 is a chip-level illustration of a portion of the circuitry of FIG. 5. Specifically, adder 90, "switch" 98, adders 74, complex multiplier 80, and adder 122 of FIG. 5 are all depicted in FIG. 7 at a level of detail needed to illustrate the pipeline timing. FIG. 8 is a diagram showing the progression of operands through the circuitry.

A detailed description of all of the chips depicted in FIG. 7 is not necessary, since most of them correspond to elements described in connection with FIG. 5. Of importance to the timing relationships, however, are the tri-state latches of FIG. 7 that make up the "switches" 98a and 98b as well as the latches 80a, 80c, and 80e included in multiplier 80 of FIG. 7. Each of these latches is periodically clocked to cause it to strobe in the signals at its input ports and, in the case of latches 80a, 80c, and 80e, to allow these signals to ripple through to their output ports. This clocking provides the basic timing of the butterfly circuit and is provided by signals sent over lines 40 (FIG. 3) from the control circuit 28. For the sake of simplicity, the lines carrying these clocking signals are not shown in FIG. 7.

In the case of the tri-state latches that make up switches 98a and 98b, the control signals on lines 40 additionally enable the outputs of selected latches. This is the way in which the switches operate. For instance, both of the latch circuits 98aa and 98ab of switch 98a receive clocking signals at the same time. However, only one of them also receives an enabling signal, and this is what determines whether subtracter 74 receives signals from lines 58a or line 90c. Similarly, only one of the tri-state latches of switch 98b is enabled at a time, and this determines which of the possible inputs will be received by subtracter 74b.

The timing will now be described by simultaneous reference to FIGS. 7 and 8.

At time $t_1$, input data are valid at the input ports of adder 90. The adder circuit operates asynchronously, and the signals ripple through the adders to provide sums, such as the sum on line 90c, that are valid by time $t_2$. At time $t_2$, the latches of switch 98 are clocked to strobe in the outputs of the adders, and one of the sets of latches in each of switches 98a and 98b is enabled so that, a short time after $t_2$, the results of the first addition on the first set of operands are available at the output ports of switch 98.

Also at $t_2$, the second set of operands arrives at the input ports of adders 90, as the first line of FIG. 8 indicates. Between times $t_2$ and $t_3$, therefore, the results of the first operations on the first set of operands are present at the output ports of the enabled latches of switch 98, while the second set of operands is present at the input ports of the adders 90. During this time, the outputs of the switches 98 are present at the input ports of subtracters 74, and the subtraction operation proceeds asynchronously during this time so that the difference signals from subtracter 74 ultimately resulting from the first set of operands are present before $t_3$.

At $t_3$, latch 80a in complex multiplier 80 is clocked, as are the latches in switches 98a, and latches 80a accordingly strobe in the difference signals from subtracter 74. Accordingly, the difference signals resulting from the first set of data are available at its output ports shortly after $t_3$, as the third line of FIG. 8 indicates. At the same time, subsequent sets of data are stepped through the preceding stages of the circuit, as the first and second lines of FIG. 8 indicate.

In FIG. 8, a break is shown in the diagram between $t_3$ and $t_N$, which represents a point in time a few clock pulses after $t_3$. Between $t_3$ and $t_N$, the clock pulses occur periodically, and data are stepped through the stages described so far. During this time, however, the output of multiplier 80b resulting ultimately from the first set of data are not yet available, because the multiplier 80b is itself pipelined, with several sets of data occupying different parts of the multiplication process. Eventually, however, the outputs of the multiplication resulting from the first set of data are available and are strobed at $t_N$ into latches 80c. At this time, as was mentioned above, processing in the previous stages has been progressing in the usual fashion, and the Nth set of data is now present at the input ports of adders 90, as the first line of FIG. 8 indicates at $t_N$. The results of previously presented data are available at the outputs of switches 98 and latch 80a, too, as the second and third lines of FIG. 8 show at $t_N$.

At $t_{N+1}$, results of the output of latch 80c have rippled through subtracter 80d, and latch 80e strobes in the results of the subtraction so that they are available shortly after $t_{N+1}$, as the fifth line of FIG. 8 indicates. At this point, if the final pass of the data through the butterfly circuit is not occurring, the results are obtained by the memory input delay/switch 48 of FIG. 3. However, the outputs of latch 80e are also present shortly after $t_{N+1}$ at the input ports of subtracter 122, which performs its subtraction asynchronously so that the difference signals are present at its output ports before $t_{N+2}$. At $t_{N+2}$, an appropriate output circuit, not shown in the drawings, can strobe in the outputs of the subtracters 122 if the last pass through the butterfly circuitry is occurring.

Figure 9:
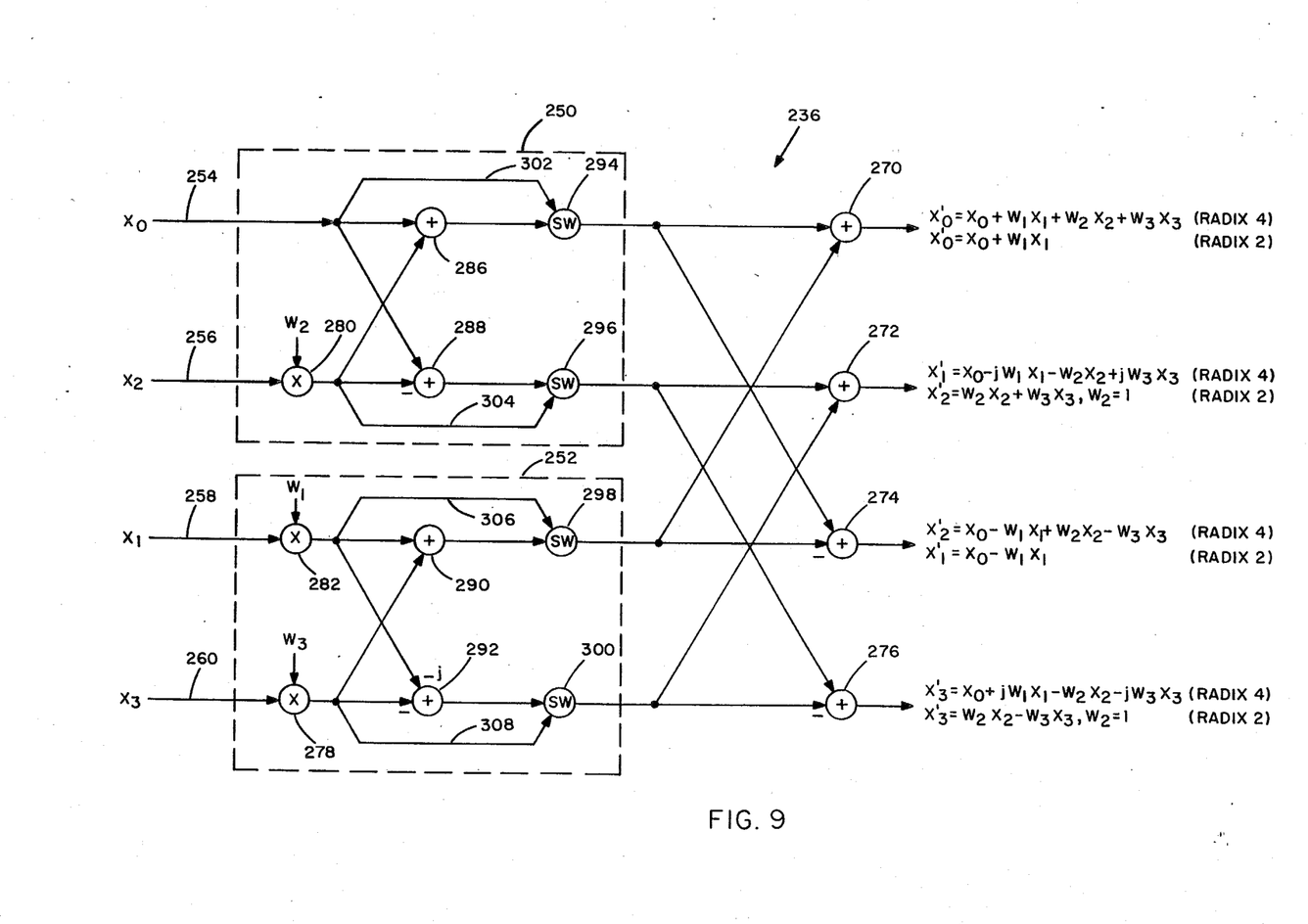
FIG. 9 is a complex-operation-level diagram of a decimation-in-time embodiment of the butterfly circuit of the present invention with the complex-to-real capability omitted.

The teachings of the present invention lend themselves to adaptation in a wide variety of embodiments, as an alternate embodiment depicted in FIG. 9 indicates.

FIG. 9 is a drawing similar to FIG. 4, but it depicts a butterfly circuit for a decimation-in-time fast Fourier transformation rather than the decimation-in-frequency transformation for which the circuit of FIG. 4 is used.

In FIG. 9, elements similar to those in FIG. 4 are designated by similar reference numerals; for instance, multiplier 282 of FIG. 9 corresponds to multiplier 82 of FIG. 4, while line 308 of FIG. 9 corresponds to line 108 of FIG. 4. Since the operation of FIG. 9 is apparent from a comparison with FIG. 4, it will not be described in detail. In general, however, the circuit of FIG. 9 performs the function suggested in FIG. 2B, while that of FIG. 4 carries out the function represented by FIG. 2A. As a result, the twiddle-factor multipliers 278, 280, and 282 of FIG. 9 are in the input circuits 250 and 252 of FIG. 9, so the butterfly-circuit outputs come directly from the combination circuits embodied in adders 270, 272, 274, and 276 in FIG. 9 rather than from subsequent twiddle-factor circuits.

Nonetheless, the principle by which circuit elements are shared by radix-two and radix-four functions in FIG. 9 is the same as that by which they are shared in FIG. 4. Namely, a control circuit can switch the input circuits between two states. In one of the states, the input circuit generates the proper input to the combination step for a radix-two butterfly operation. In the other state, combination-step inputs for a radix-four butterfly operation are generated. The result is that most of the circuit elements used for the two radix-two operations are already provided in the radix-four butterfly circuit, so very little additional circuitry is needed to provide a butterfly circuit for a mixed-radix fast Fourier transformation.

Additionally, both embodiments lend themselves to modular construction; all of the elements employed in a single radix-two butterfly circuit can readily be added to other circuitry to produce a combination radix-two and radix-four circuit.

Circuitry for a complex-to-real conversion can be provided for the decimation-in-time circuit of FIG. 9 just as such circuitry was provided for the decimation-in-frequency circuitry of FIG. 4. Such additional circuitry is depicted in FIG. 10, which includes double lines in place of the single lines of FIG. 9 to show the separate real and imaginary parts explicitly.

Figure 10:
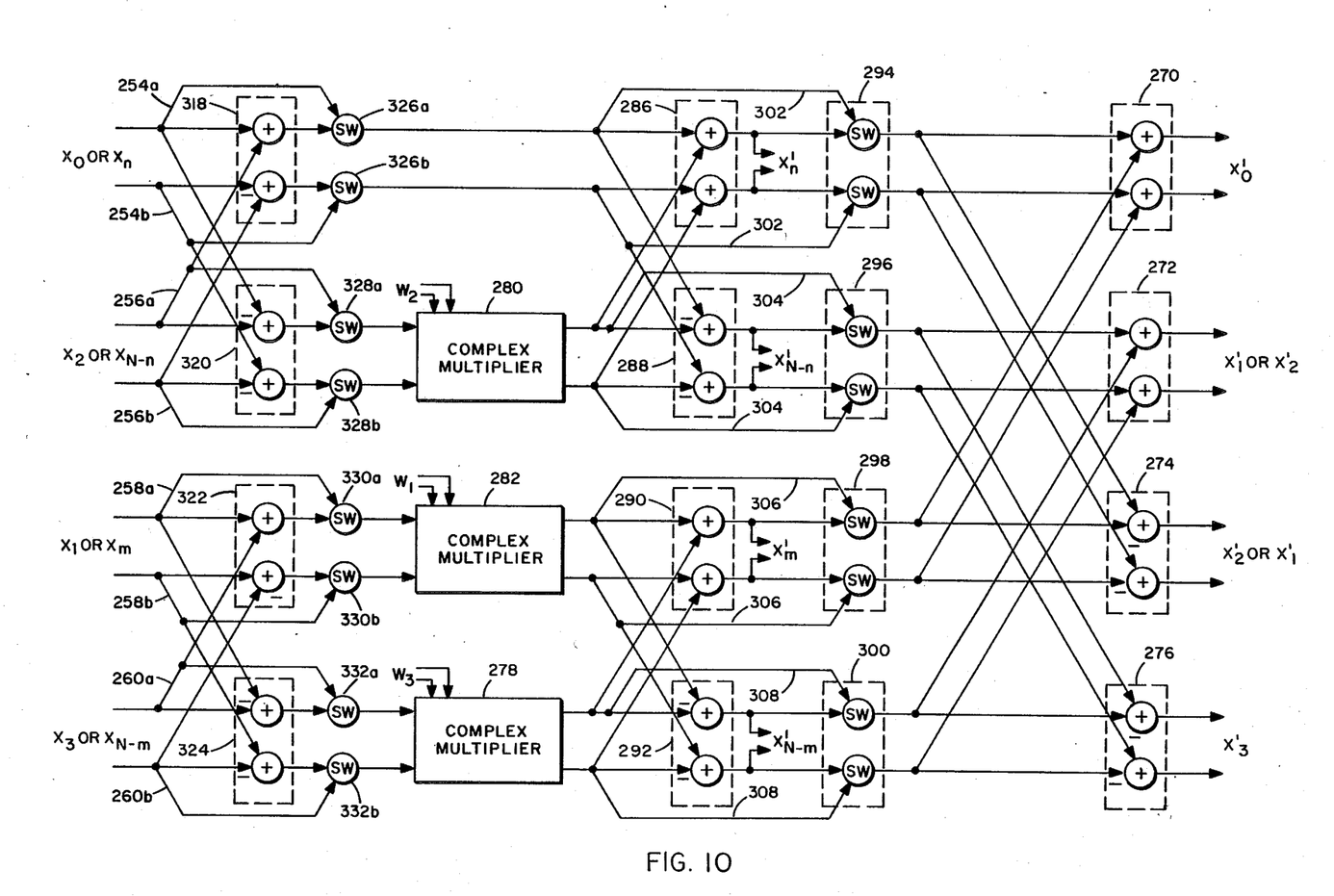
FIG. 10 is a more detailed diagram of the embodiment of FIG. 9 with the complex-to-real capability included.

Most of the circuitry of FIG. 10 is the same as that of FIG. 9, so the common elements will not be described in detail. The major difference between the circuitry depicted in the two drawings is that pairs of adder circuits 318, 320, 322, and 324 have been added in parallel with input lines 254, 256, 258, and 260, respectively. A choice between the signals on lines 254, 256, 258, and 260, on the one hand, and the output signals from adder pairs 318, 320, 322, and 324, on the other hand, is made by pairs of switches 326, 328, 330, and 332.

Inspection of the circuitry reveals that the operation of the circuit of FIG. 10 is the same as that of FIG. 9 if switches 326, 328, 330, and 332 forward the signals from the input lines rather than from the adders. That is, the outputs of adders 270, 272, 274, and 276 are ordinary radix-two or radix-four butterfly outputs. When the circuit is to be used for a complex-to-real conversion, however, switches 326, 328, 330, and 332 forward the adder outputs rather than the unprocessed input data, and the output of the circuit is taken from adders 386, 388, 390, and 392, rather than from adders 270, 272, 274, and 276. To perform a complex-to-real conversion, the $X_0$ input ports are provided with some transform output $X_n$ while the $X_2$ port receives $X_{N-n}$. Some other transform output $X_m$ is applied to the $X_1$ input port, while $X_{N-m}$ is applied to the $X_3$ input port. The complex multipliers 278, 280, and 282 are operated with $W_1=1$, $W_2=-\sin(\pi n/N)--\cos(\pi n/N)$, and $W_3=-\sin(\pi m/N)-j\cos(\pi m/N)$. Inspection of the circuitry and of the complex-to-real equations set out above reveals that the outputs of adders 286, 288, 290, and 292 will be $X'_n$, $X'_{N-n}$, $X'_m$, and $X'_{N-m}$ respectively, as those terms are defined in the complex-to-real equations, when the circuitry of FIG. 10 is operated in this manner. Thus, the circuitry of FIG. 10 can be used for an extra pass at the end of a transformation to perform the complex-to-real conversion.

It should be recognized that, although the invention has been described by way of specific examples, its teachings have broader application. It is clear, for example, that the arrangement of FIG. 4 can generate two complete sets of radix-two butterfly outputs. However, it is also clear that the teachings of the present invention can be employed in using a radix-four circuit to generate only a single set of radix-two butterfly outputs, or, indeed, a single member of a set of radix-two butterfly outputs. For instance, if the FIG. 4 circuit did not include parallel paths 104 and 108 and thus did not include "switches" 96 and 100, it would still be possible to perform a single radix-two butterfly operation, the radix-two outputs coming from adder 70 and multiplier 80. In fact, the circuit of FIG. 4 could be employed in connection with other circuitry to generate one of the radix-two butterfly outputs of $X_0$ and $X_1$ so that multiplier 80 would not have to apply a radix-two twiddle factor but adder 70 would still supply one of the complex radix-two outputs.

What is claimed is:

1. In a fast-Fourier-transform butterfly circuit for performing a butterfly operation, the butterfly circuit including two input circuits, each of which is adapted to receive two complex data inputs and generate two input-circuit outputs that depend on both of the complex inputs, the butterfly circuit also including four combination circuits, each of which is responsive to two input-circuit outputs to generate a combination output, the butterfly circuit further including three twiddle-factor circuits for receiving complex data-dependent inputs and complex twiddle-factor inputs and multiplying the data-dependent inputs by the twiddle-factor inputs to generate twiddle-factor outputs, the butterfly circuit further including control circuit means for applying twiddlefactor inputs to the twiddle-factor circuits so that the combination outputs, as modified by the twiddle-factor circuits, constitute butterfly outputs, an apparatus comprising:

A. means for operating each input circuit, responsive to a radix signal that indicates whether the input circuit is to produce radix-two or radix-four outputs, and for generating at least one of a radix-two combination-circuit input and a radix-four combination-circuit input as determined by the radix signal, so that the butterfly circuit produces at least one radix-two butterfly-circuit output when the radix signal indicates radix two and produces at least one radix-four butterfly-circuit output when the radix signal indicates radix four; and B. means for operating the control circuit to selectively provide the twiddle factor inputs in response to the radix signal, the butterfly circuit thus being capable of Performing both radix-two and radix-four butterfly operations.

2. A conversion circuit for generating proper nth and N-nth discrete-Fourier-transform values from nth and N-nth output values of a discrete Fourier transform means, the discrete Fourier transform means arranged to receive even and odd real values as real and imaginary components of its complex inputs, the conversion circuit being adapted to receive as input signals the nth and N-nth output values of the discrete Fourier transform means, the conversion circuit comprising: means for generating a real-sum signal representing the sum of the real parts of the values represented by the input signals; means for generating an imaginary-sum signal representing the sum of the imaginary parts of the values represented by the input signals; means for generating a complex unity-root-product signal representing the product of a root of unity and a complex number consisting of the difference between the real parts of the values represented by the input signals and the sum of the imaginary parts of the values represented by the input signals; difference means, connected to receive the real-sum signal, the imaginary-sum signal, and the unity-root-product signal, for generating the nth proper-value signal representing the difference between the complex unity-root product signal and a complex number represented by the real-sum signal and the imaginary-sum signal; and a summing circuit, connected to receive the complex unity-root-product, real-sum, and imaginary-sum signals and to generate the N-nth proper-value signal as a complex signal having its real part equal to the sum of the real-sum signal and a real part of the unity-root-product signal and having its imaginary part equal to the difference between a negative of the imaginary-sum signal and the imaginary part of the unity-root-product signal.

3. An apparatus for performing a radix-two decimation-in-frequency (DIF) butterfly operation and for generating proper nth and N-nth discrete-Fourier-transform values from nth and N-nth output values of a discrete Fourier transform device, the discrete Fourier transform device arranged to receive even and odd real values as real and imaginary components of its complex inputs, the apparatus comprising:

A. first and second input circuits, each of which is adapted to receive a complex data input, the first input circuit generating a first input-circuit output that represents the same value as that represented by its data input, the second input circuit being adapted to receive a mode signal and generating a second input-circuit output that, when the mode signal is in a butterfly state, represents the same value as that represented by its data input and, when the mode signal is in a conversion state, represents the complex conjugate of the value represented by its data input;

B. a first common combination circuit responsive to the first and second input-circuit outputs to generate a first combination output representing the sum of the values represented by the first and second input-circuit outputs;

C. a second common combination circuit responsive to the first and second input-circuit outputs to generate a second combination output representing the difference between the values represented by the first and second input-circuit outputs;

D. a multiplier, connected to receive the second combination output and adapted for application thereto of unity-root signals representing a root of unity, for multiplying the second combination output by the root of unity to generate a multiplier output;

E. a first conversion combination circuit connected to receive the first combination output and the multiplier output and produce therefrom a first conversion output representing the difference between the values that they represent;

F. a second conversion combination circuit connected to receive the first combination output and the multiplier output and produce therefrom a second conversion output representing the sum of the complex conjugates of the values that they represent; and G. control circuit means operable in a butterfly mode for applying butterfly mode signals to the second input circuit and for applying to the multiplier unityroot signals that represent twiddle factors of a DIF butterfly operation so that the first combination output and the multiplier output constitute fast-Fourier-transform butterfly outputs, said control circuit means also being operable in a conversion mode for applying conversion mode signals to the second input circuit and for applying to the multiplier unity-root signals that represent the unity roots of a complex-to-real conversion so that, if the complex data inputs of the first and second input circuits represent the nth and N-nth DFT output values of the discrete Fourier transform device, the conversion outputs thus representing the proper nth and N-nth discrete-Fourier-transform values and, the apparatus thus employing common circuitry for both the butterfly operation and the complex-to-real conversion.

4. Apparatus for performing decimation in frequency fast Fourier transform butterfly operations on four complex input signals, comprising:

a complex adder circuit, fed by the four input signals, for providing four complex adder circuit outputs;

selecting means, fed by the four input signals, the four adder input circuit outputs and a control signal that indicates selection of radix-two or radix-four operation, and having four complex selected outputs, for selecting the four input signals as the four selected outputs when the control signal indicates radix two and for selecting the four radix-four input circuit outputs as the four selected outputs when the control signal indicates radix four; and twiddle factor means, fed by the four selected outputs and the control signal, and having four complex butterfly output signals, for performing a radix-four twiddle factor operation when the control signal indicates radix four and for performing two radix-two twiddle factor operations when the control signal indicates radix two.

5. Apparatus as in claim 4:

wherein said apparatus additionally comprises complex conjugate means, fed by the third and fourth of the four complex signals, for providing the first and second complex conjugate signals; and final adjustment means, fed by the four butterfly output signals, for providing four complex adjusted output signals and for compensating for erroneous fast Fourier transform operations occurring when the four complex input signals represent eight real signals;

and wherein the control signal also indicates selection of complex to real conversion and the selecting means also is fed by first and second complex conjugate signals and also selects, the first and second complex conjugate signals respectively as the third and fourth of the four selected outputs when the control signal indicates selection of complex to real conversion.

6. Apparatus as in claim 4 wherein the radix four input circuit means comprises:

first and second complex adders, the first adder fed by the first and second of the four complex signals, and having a first adder output and the second adder fed by the third and fourth of the four complex signals and having a second adder output;

first and second complex subtractors, the first subtractor fed by the first and second of the four complex signals and having a first subtractor output, and the second subtractor fed by the third and fourth of the four complex signals and having a second subtractor output; and means, fed by the second subtractor output, for exchanging real and imaginary parts of the second subtractor output, and providing an exchanged second subtractor output.

7. Apparatus as in claim 6 wherein said selecting means comprises:

first, second, third and fourth complex switch means, each switch means fed by the control signal, each switch means fed at a radix two input by its respective one of the first, second, third or fourth of the four complex signals, the first and third switch means respectively fed at a radix four input by the first and second adder outputs and the second and fourth switch means respectively fed at a radix four input by the first subtractor output and the exchanged second subtractor output and each switch means having an output, each switch means for selecting its respective output as the radix two input when the control signal indicates radix two and for selecting as its respective output the radix four input when the control signal indicates radix four.

8. Apparatus as in claim 7 wherein said twiddle factor means comprises:

third and fourth complex adders, the third adder fed by the first and third switch means outputs and having a third adder output, and the fourth adder fed by the second and fourth switch means outputs and having a fourth adder output;

third and fourth complex subtractors, the third subtractor fed by the first and third switch means outputs and having a third subtractor output, and the fourth subtractor fed by the second and fourth switch means outputs and having a fourth subtractor output; and first, second and third complex multipliers, the first multiplier fed by the fourth adder and a first complex twiddle factor signal and having a first multiplier output, the second multiplier fed by the third subtractor and a second complex twiddle factor signal and having a second multiplier output, and the third multiplier fed by the fourth subtractor and a third complex twiddle factor signal and having a third multiplier output.

9. Apparatus as in claim 8:

wherein said apparatus additionally comprises complex conjugate means, fed by the third and fourth of the four complex signals, for providing the first and second complex conjugate signals; and final adjustment means, fed by the four butterfly output signals, for providing four complex adjusted output signals and for compensating for erroneous fast Fourier transform operations occurring when the four complex input signals represent eight real signals;

and wherein the control signal also indicates selection of complex to real conversion and the selecting means also is fed by the first and second complex conjugate signals and also selects the first and second complex conjugate signals respectively as the third and fourth of the four selected outputs when the control signal indicates selection of complex to real conversion.

10. Apparatus as in claim 9 wherein said final adjustment means comprises:

fifth and sixth complex subtractors, said fifth subtractor fed by the third adder output and the second multiplier output, said sixth subtractor fed by the first and third multiplier outputs; and fifth and sixth complex adders, each having inverting imaginary inputs, said fifth adder fed by the third adder output and the second multiplier output, and said sixth adder fed by the first and third multiplier outputs.

11. Apparatus for performing decimation in time fast Fourier transform butterfly operations on four complex input signals comprising:

twiddle factor means, fed at four complex inputs by the four input signals and a control signal that indicates selection of radix two or four operation and having four complex factored signals as an output, for performing a radix four twiddle factor operation when the control signal indicates radix four and for performing two radix two twiddle factor operations when the control signal indicates radix two;

first combining means, fed by the four factored signals, for combining the factored outputs and providing four complex intermediate radix four signals;

first selecting means, fed by the four factored signals, the four intermediate radix four signals and the control signal, and having four complex resulting signals as outputs, for selecting the four factored signals as the four resulting outputs when the control signal indicates radix two and for selecting the four intermediate radix four signals as the four resulting outputs when the control signal indicates radix four; and second combining means, fed by the four resulting outputs, for providing four butterfly output signals.

12. Apparatus as in claim 11 wherein:

the control signal also indicates selection of complex to real conversion:

said selecting means comprises means for selecting the four factored signals as the four selected outputs when the control signal indicates complex to real conversion:

said twiddle factor means four inputs are fed by four complex selected signals:

said apparatus additionally comprises input adjustments means, fed by the four complex input signals, for providing four complex adjusted signals and for compensating for erroneous fast Fourier transform operations occurring when the four complex inputs represent eight real signals; and said apparatus additionally comprises second selecting means, fed by the four input signals, the four adjusted signals and the control signal, and having the four selected signals as outputs, for selecting the four input signals as the selected signals when the control signal indicates radix two or radix four, and for selecting the four adjusted signals as the selected output signals when the control signal indicates complex to real conversion.

13. Apparatus as in claim 11 wherein said twiddle factor means comprises:

first, second and third complex multipliers, said first multiplier fed by the second of the four input signals and a first complex twiddle factor signal, and having a first multiplier output, said second multiplier fed by the third of the four input signals and a second complex twiddle factor signal and having a second multiplier output, and said third multiplier fed by the fourth of the four input signals and a third twiddle factor signal and having a third multiplier output.

14. Apparatus as in claim 13 wherein said first combining means comprises:

first and second complex adders, said first adder fed by the first input signal and the first multiplier output and having a first adder output, and said second adder fed by the second and third multiplier outputs and having a second adder output; and first and second complex subtractors, said first subtractor fed by the first input signal and the first multiplier output and having a first subtractor output, and said second subtractor fed by the second and third multiplier outputs and having a second subtractor output; and means, fed by the second subtractor output, for exchaning real and imaginary parts of the second subtractor output, and providing an exchanged subtractor output.

15. Apparatus as in claim 14 wherein said first selecting means comprises:

first, second, third and fourth complex switch means, each switch means fed by the control signal and each switch means having a radix two input, a radix four input and an output, the first, second, third and fourth switch means radix two inputs respectively fed by the first input signal, and the first, second and third multiplier outputs, the first, second, third and fourth switch means radix four inputs fed respectively by the first adder, first subtractor, second adder and exchanged subtractor outputs, each switch means for selecting its radix two input as its output when the control signal indicates radix two, and for selecting its radix four input as its output when the control signal indicates radix four.

16. Apparatus as in claim 15 wherein said second combining means comprises:
third and fourth complex adders, said third adder fed by the first and third switch means outputs, and said fourth adder fed by the second and fourth switch means outputs; and
third and fourth complex subtractors, said third subtractor fed by the first and third switch means outputs, and said fourth subtractor fed by the second and fourth switch neans.

17. Apparatus as in claim 16 wherein: the control signal also indicates selection of complex to real conversion:
said selecting means comprises means for selecting the four factored signals as the four selected outputs when the control signal indicates complex to real conversion;
said twiddle factor means four inputs are fed by four complex selected signals:
said apparatus additionally comprises input adjustment means, fed by the four complex input signals; for providing four complex adjusted signals and for compensating for erroneous fast Fourier transform operations occurring when the four complex inputs represent eight real signals; and
said apparatus additionally comprises second selecting means, fed by the four input signals, the four adjusted signals and the control signal, and having the four selected signals as outputs, for selecting the four input signals as the selected signals when the control signal indicates radix two or radix four, and for selecting the four adjusted signals as the selected output signals when the control signal indicates complex to real conversion.

18. Apparatus as in claim 17 wherein said input adjustment means comprises:
first and second complex add-subtract means, said first add-subtract means fed by the first and second input signals and for providing the first of the four complex adjusted signals as a complex signal having a real part equivalent to the sum of real parts of the first and second input signals and an imaginary part equivalent to the difference between imaginary parts of the first and second input signals, and the second add-subtract means fed by the third and fourth input signals, for providing the third adjusted signal as a complex signal having a real part equivalent to the sum of real parts of the third and fourth input signals and an imaginary part equivalent to the difference between imaginary parts of the third and fourth input signals; and
fifth and sixth complex subtractors, said fifth subtractor fed by the first and second input signals and having the second adjusted signal as an output, and said sixth subtractor fed by the third and fourth input signals and having the fourth adjusted signal as an output.

19. A method of performing decimation in frequency fast Fourier transform butterfly operatons on four complex input signals comprising:
responsive to the four input signals, producing four complex radix-four output signals;
responsive to the four input signals, the four radix-four input circuit outputs and a control signal that indicates selection of radix two or radix four operation, selecting the four input signals as four complex selected outputs when the control signal indicates radix two, and the four radix-four input circuit outputs as the four complex selected outputs when the control signal indicates radix four; and
responsive to the four complex selected outputs and the control signal, performing a radix-four twiddle factor operation when the control signal indicates radix four and for performing two radix-two twiddle factor operations when the control signal indicates radix two.

20. A method as in claim 19 wherein said method additionally comprises
responsive to the third and fourth of the four complex signals, providing the first and second complex conjugate signals; and
responsive to the four butterfly output signals, providing four complex adjusted output signals and for compensating for erroneous fast Fourier transform operations occurring when the four complex input signals represent eight real signals
and wherein the control signal also indicates selection of complex to real conversion and the selecting means also is fed by first and second complex conjugate signals and also selects, the first and second complex conjugate signals respectively as the third and fourth of the four selected outputs when the control signal indicates selection of complex to real conversion.

21. A method of performing decimation in time fast Fourier transform butterfly operations on four complex input signals, comprising the steps of:
responsive to the four input signals and a control signal that indicates selection of radix two or radix four operation, performing a radix-four twiddle factor operation when the control signal indicates radix four and for performing two radix-two twiddle factor operations when the control signal indicates radix two, to produce four complex factored signals as an output;
responsive to the four factored signals, combining the factored outputs to produce four complex intermediate radix-four signals;
responsive to the four factored signals, the four intermediate radix-four signals and the control signal, selecting the four factored signals as four complex resulting output signals when the control signal indicates radix two, and the four intermediate radix-four signals as the four resulting output signals when the control signal indicates radix four; and
combining the four resulting outputs to produce four butterfly output signals.

22. A method as recited in claim 21 wherein:
the control signal also indicates selection of complex to real conversion:
said selecting step selects the four factored signals as the four selected outputs when the control signal indicates complex to real conversion; and
the method additionally comprises:
responsive to the four complex input signals, providing four complex adjusted signals and compensating for erroneous fast Fourier transform operations occurring when the four complex inputs represent eight real signals; and responsive to the four input signals, the four adjusted signals and the control signal, selecting the four input signals as the selected signals when the control signal indicates radix two or radix four, and the four adjusted signals as the selected output signals when the control signal indicates complex to real conversion.

* * * * *